Aug. 23, 1966    G. A. NELSON    3,268,103
PRESSURE VESSEL DESIGN
Filed Aug. 3, 1964
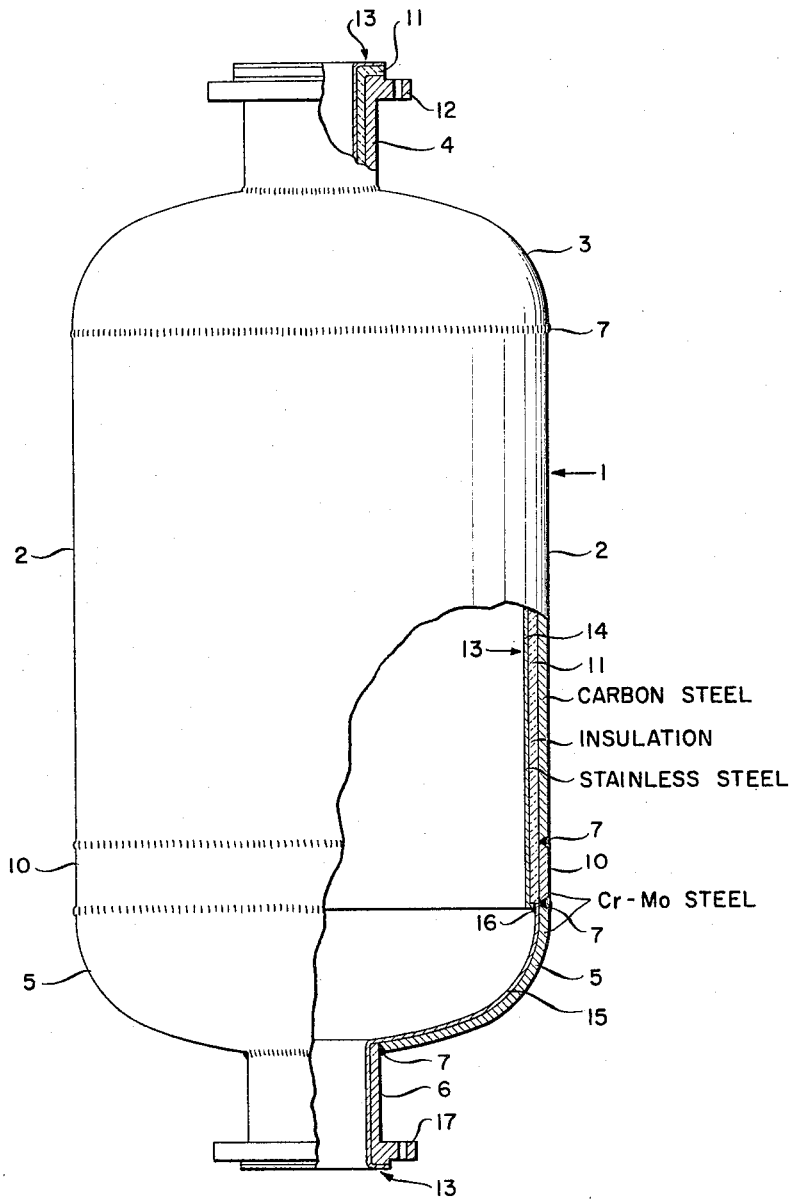
INVENTOR:
GEORGE A. NELSON
BY: [signature]
HIS ATTORNEY United States Patent Office 3,268,103
Patented August 23, 1966

3,268,103
PRESSURE VESSEL DESIGN
George A. Nelson, Berkeley, Calif., assignor to Shell Oil Company, New York, N.Y., a corporation of Delaware
Filed Aug. 3, 1964, Ser. No. 386,903
7 Claims. (Cl. 220—3)

This invention relates to pressure vessels suitable for containing gases which damage metal by diffusion into the metal, such as hydrogen, alone or in a mixture with other substances at elevated temperatures and pressures. In particular, this invention relates to a pressure vessel for containing gases as mentioned above and which are provided with a lining suitable for resisting corrosion by materials in the pressure vessel, for example, sulfides, acids and the like. Such vessels are useful, for example, as reactors for the hydrogenation or dehydrogenation of hydrocarbons, and for the synthesis of ammonia. In such uses, the vessel, in addition to containing other substances, contains hydrogen at elevated temperatures and pressures. During the processes, the hydrogen passes into the metal of the walls of the vessel, and in vessels fabricated from ordinary carbon steel, causes decarburization, embrittlement and cracking of the vessel.

It has been the practice in the past to construct vessels or reactors for containing hydrogen of alloys of steel which are capable of resisting hydrogen such as chromium, molybdenum, tungsten, vanadium and manganese steels having a low carbon content. However, constructing vessels purely of these metals greatly increases the already large cost of these reactors in view of the relatively high cost of these steel alloys over ordinary carbon steel. Moreover, it is also known to construct vessels for containing hydrogen of a plurality of layers or sections, wherein only the inner layer or layers are resistant to hydrogen deterioration and corrosion, and the outer section or sections are of carbon steel. The principle used in such multi-section vessels is that resistant metals are used in the inner section whereat the pressure and temperature are both high, and lower cost steel is used on the outer section, whereat lower pressure and temperature prevail. One very commonly used multi-section construction of pressure vessels for containing hydrogen is to provide an outer layer or shell for the pressure vessel which is fabricated of structural steel, i.e., carbon steel, low alloy steel or hydrogen steel, and an inner lining or layer of hydrogen and corrosion resistant metal such as stainless steel. The two metal layers of the pressure vessel are then separated by a layer of insulating material which reduces the temperature of the outer shell to a value at which it becomes resistant to deterioration by hydrogen gas absorption at the prevailing pressure. This layer of insulating material is required because although the inner shell is fabricated of hydrogen resistant metal, and will preserve the fluid pressure within the vessel, such resistant metals do permit hydrogen to diffuse through the metal and consequently this hydrogen reaches the inner surface of the outer layer or shell.

Although pressure vessels constructed in this latter manner have proved successful in terms of reducing deterioration of the vessel due to the gas absorption, such a construction does present additional problems both in cost and in terms of hydrogen deterioration of the shell when it becomes necessary to weld additional nozzles to the shell or to install heavy internal structures in the vessel such as may be required to support catalyst beds, inject feed or coolant, or dump the catalyst. Since any such structures must, in order to be firmly supported, contact the outer structural steel shell of the vessel, and will therefore transmit heat from the interior of the vessel to the external shell, hydrogen attack of the shell eventually occurs unless the portion of the outer shell to which the heat is transmitted is constructed of hydrogen resistant alloy steel. Moreover, the use of an insulating lining on the interior of the shell presents various other problems when mounting the heavy internal structures within the vessel, both because of the problem of insuring that no leaks exist through the lining whereby the contents of the vessel can attack the outer shell, and because of the problems of properly securing the support columns for the above-mentioned internal structures to the vessel so that the weight of these internal structures, which may be as high as 100 tons per support column, does not damage the insulating material or the inner corrosion resistant liner.

Although the above problems with the prior art construction may be eliminated by constructing the portion of the shell to which the nozzles are to be welded and to which the supports for the internal structures are to be fastened of a metal which is not subject to deterioration by gas absorption at the temperatures and pressures which exist within the vessel, and then removing the insulation between this portion of the outer shell and the inner corrosion resistant lining, it should be noted that with this type of construction, heat will still be transmitted via the uninsulated resistant section of the shell to the insulated section of the shell with which it is in contact, thereby causing deterioration by gas absorption to occur in the insulated portion of the shell.

In order to eliminate the above problems, the improved construction of the pressure vessel according to the invention comprises a shell having a first section formed of structural or carbon steel and a second section to which the supports are to be connected formed of a metal which is resistant to deterioration by gas absorption at the temperatures and pressures which exist in the vessel; a layer of thermal insulating material completely lining the interior of the first section of the shell and extending over the interior of the second section of the shell a distance sufficient to produce a temperature gradient across the insulated portion or band of the second section of the shell which is sufficient to reduce the temperature at the junction of the first and second sections of the shell to a temperature at which the first section of the shell is not subject to deterioration by gas absorption; and, a lining or shield of metal which is resistant to deterioration by gas absorption at the temperatures and pressures existing in the vessel and to corrosion by the contents of the vessel. The lining or shield of corrosion resistant metal is supported within the vessel in a manner whereby it is effectively insulated from the first section of the shell and at least completely covers the interior surface of the thermal insulating material. If the uninsulated portion of the shell is formed of a metal which is also resistant to corrosion by the particular contents of the vessel, then the interior metal lining need not line the second section of the shell. However, in view of the high cost of metals which are resistant both to deterioration by gas absorption and to corrosion, preferably the lining of corrosion resistant metal also completely lines the interior surface of the uninsulated portion of the second section of the shell which may then be constructed of a less expensive metal alloy.

Various metals may be used for the internal metal lining and for the second section of the shell in accordance with the partial pressure of the hydrogen or other injurious gas and the prevailing temperatures as well as in accordance with the corrosive nature of the vessel contents. In general, the second section of the shell and the inner layer of metal contains at least 0.005% of one or more carbide stabilizing metals of the class consisting of boron, chromium, vanadium, molybdenum, tungsten, titanium and columbium to resist decarburization and cracking by hydrogen. Preferably, however, the internal metal lining is formed of stainless steel.

The operating limits for a few steels in hydrogen service at various temperatures and partial pressures of hydrogen are described in "Metals for High Pressure Hydrogenation Plants," by George A. Nelson, in the Transactions of the A.S.M.E., volume 73 (1951), pages 205–213. The resistance of various metals to hydrogen attack is shown in a chart on page 207 of this article. From this chart, it is seen that, for example, at a temperature of 700° F. and a hydrogen partial pressure of 2000 pounds per square inch, a 2.0 chrome, 0.5 molybdenum steel would be suitable for the second section of the shell.

Resistance of the inner metal lining and the second section of the shell to deterioration by nitrogen gas absorption is obtained by utilizing steel alloys high in nickel, such as 15 chrome, 35 nickel steel.

Resistance of various metal alloys against corrosion by $H_2S$ is described in "Sulfide Scaling Under Hydrofinding Conditions," by W. H. Sharp and E. W. Haycock, Proceeding of the American Petroleum Institute, volume 39 (III) 1959, pages 74–91. When corrosion of the metals forming the pressure vessel is due to chlorine and chlorine compounds, resistance to such corrosion may be provided by using hastelloy and Monel metal high in nickel content.

It should be noted that the above-mentioned specific metals and the particular metals used in the specific example to be described below are but representative of the various metals which may be used in accordance with this invention, the objects and advantages of which will be more clearly understood from the following detailed description when taken in conjunction with the attached figure which is an elevational view, partially in section, of a preferred embodiment of a pressure vessel according to the invention.

Referring now to the drawing, there is shown a pressure vessel or reactor for containing hydrogen at elevated pressures and temperatures having an outer shell 1 which, as is conventional in the art with vessels of this type, is formed of a plurality of separate parts, i.e., a cylindrical or main body portion 2, a top head 3 including its associated nozzle 4, and a bottom head 5 including its associated nozzle 6, all of which are united by means of welds 7. Additionally, in the preferred construction according to the invention, the shell 1 is provided with a transition piece or cylindrical band of metal 10 which forms a portion of the shell 1 and is welded between the bottom head 5 and the cylindrical body portion 2. The shell 1 is of sufficient thickness to withstand the pressures within the vessel, and, as pointed out above, is constructed with a first section (cylindrical body portion 2, top head 3 and nozzle 4) fabricated from carbon steel, and a second section (bottom head 5, nozzle 6 and transition piece 10) fabricated from an alloy steel which is not subject to decarburization or embrittlement by hydrogen at the pressures and temperatures which are to exist within the vessel. Preferably, the various parts forming the second section of the shell are all fabricated from the same steel alloy. However, it is to be understood that various steel alloys may be used for the parts forming the second section of the shell, the only requirement being that the steel alloys used be resistant to deterioration by gas absorption at the operating conditions of the vessel. Moreover, it should be noted that although the second section of the shell is shown as comprising three separate parts, i.e., the bottom head 5, the nozzle 6 and the transition piece 10, if desired this section of the shell may be constructed in one piece. More commonly, however, the second section of the shell will be constructed as shown in view of the difficulty and extreme cost of fabricating a single piece with the shown configuration.

In order to protect the parts 2, 3 and 4 of the shell which are constructed of carbon or other structural steels from deterioration by absorption of hydrogen from the contents of the vessel, the interior surface of all such parts of the shell are lined with a layer of thermal insulating material 11, such as a fused alumina aggregate with a Rolandshutte calcium aluminate binder, which is of sufficient thickness to produce a temperature gradient sufficient to reduce the temperature of the insulated section of the shell 1 to a value at which it is not subject to hydrogen gas deterioration at the hydrogen partial pressurees existing within the vessel. Preferably the insulating lining 11 extends completely through the nozzle 4 and overlays a portion of the bolting flange 12 formed on the nozzle 4.

Additionally, the layer of insulating material 11 is extended to line the interior surface of the metal band or transition piece 10. Although the transition piece 10 is constructed of a metal which is not subject to hydrogen deterioration at the temperatures and pressures in the vessel, if the interior of the band 10 is not insulated from the interior of the tank by means of the lining 11, the entire transition piece 10 will be at the temperature existing in the vessel, and hydrogen attack of the cylindrical member 2 at its junction with the transition piece 10 will occur due to gas diffusing through the metal of the transition pieces 10. In order to avoid such hydrogen deterioration of the cylindrical body portion 2, the metal band or transition piece 10 is of sufficient length to reduce the temperature of the band 10 at its junction with the portion of the shell (2) formed of carbon steel from the temperature of the lower head 5, which is essentially the temperature existing within the vessel, to a temperature at which hydrogen deterioration of the carbon steel portion of the shell does not occur.

In order to protect the shell of the vessel from corrosion due to the contents within the vessel and to maintain the layer of insulation 11 in its proper position within the shell, an internal metal lining or shield 13 is provided which is resistant to corrosion by the contents within the vessel and to attack by gas absorption at the temperatures and pressures existing in the vessel. The metal lining 13, which may be given a shape which conforms to the contour of the interior of the vessel, is supported within the vessel in any manner whereby it is effectively insulated from the first section of the shell 1, i.e., the parts of the shell fabricated from structural steel, and at least completely covers the interior surface of the layer of insulating material 11.

Preferably as shown in the drawing, the metal lining 13 comprises a first portion 14 which is shaped to conform to the inner surface of the insulated portion of the shell and tends to keep the insulation in place, and a second portion 15 which completely covers the interior surfaces of the uninsulated portions 5 and 6 of the shell and is bonded thereto as by welding or by rolling whereby the portion 14 forms a cladding; the two portions 14 and 15 of the lining 13 being joined together by means of a weld 16. The lining 13 is extended through the nozzles 4 and 6 to overlay a portion of the faces of the bolting flanges 12 and 17 respectively, in order to insure proper protection of these parts against corrosion. The portion of the lining 13 which overlays the face of flange 12, and is insulated therefrom by the layer of insulating material 11, may be secured to the vessel by means of a gasket (not shown) pressed against the flange 12 by a flange on an attached pipe, cover or the like (also not shown), and tends to aid in the support of the lining 13. The major support for the lining 13, however, is provided by its connection with the uninsulated portion of the shell 1.

Although as shown in the figure, the metal lining 13 preferably completely lines the interior surface of the uninsulated portions of the shell, it should be noted that in the event that the head 5 and nozzle 6 are formed of corrosion resistant metal (stainless steel) as might be economical in small vessels, or of metal which is not subject to corrosion by the contents of the vessel, then it is not necessary for the lining 13 to extend along the interior surface of the uninsulated portions of the shell 1. Moreover it should be noted the lining 13 need not be constructed of a single metal, e.g., different metals may be used for the portions 14 and 15, nor does the portion 14 of the lining need to be supported at its lower end by welding it to the uninsulated portion of the vessel but any convenient method of supporting the upper portion of the lining 14, e.g., a ledge attached to the uninsulated portion of the vessel and upon which the lower end of the portion 14 rests, may be used.

As a specific example of the materials from which the vessel according to the invention may be constructed, the uninsulated portion of the shell and the insulated transition piece may be formed from 2¼ chrome, 1-molybdenum steel and the inner metal lining 13 may be formed from 18-chrome, 8-nickel stainless steel with the particular thicknesses of the various metals determined by the total pressures and other conditions within the vessel. Both of these steels are resistant to deterioration by hydrogen gas absorption and the steel alloy used for the lining 13 is additionally resistant to corrosion by sulfides. However, in order to further reduce the cost of the vessel, the portion 14 of the lining 13, which is easier in service than the portion 15, may be constructed of 12-chrome, ½-molybdenum stainless steel which is still resistant to corrosion by sulfides and deterioration by hydrogen absorption but is cheaper than the 18-chrome, 8-nickel steel preferably used for portion 15 of the lining 13.

It will be understood that the lining 13 may be fabricated in accordance with usual engineering practice to allow for differential thermal expansion as by crimping it circumferentially and/or vertically. Also the various fittings for distribution of process fluid and the like and various other structures which may be secured to the shell are not shown since they form, per se, no part of the invention.

Obviously, various other modifications of the invention are possible in the light of the above teachings without departing from the spirit of the invention. For example, the vessel might be spherical rather than cylindrical, or the upper head of the vessel might be constructed according to the invention. It is therefore to be understood that within the scope of the appended claims, the invention may be practiced otherwise than as specifically illustrated.

I claim as my invention:
1. A pressure vessel comprising:
   a shell having a first section of metal which is subject to deterioration by gas absorption at the pressures and temperatures existing within said pressure vessel and a second section of metal which is resistant to deterioration by gas absorption at said pressures and temperatures;
   a layer of thermal insulation completely lining the interior surface of said first section of said shell and extending over the adjacent portion of the interior surface of said second section of said shell a distance sufficient to produce a temperature gradient across the insulated portion of said second section of said shell sufficient to reduce the temperature of said second section of said shell at its junction with said first section of said shell to a temperature at which said first section of said shell is resistant to deterioration by gas absorption; and,
   a lining of metal which is resistant to corrosion by the contents of the pressure vessel and to deterioration by gas absorption at the temperatures and pressures existing in said vessel, said metal lining being supported within said vessel and completely covering the interior surface of said layer of thermal insulation.

2. The pressure vessel of claim 1 wherein said metal lining is bonded to the interior surface of the uninsulated portion of said second section of said shell.

3. The pressure vessel of claim 2 wherein said metal lining completely covers the interior surfare of the uninsulated portion of said second section of said shell.

4. A pressure vessel for containing hydrogen under pressure at elevated pressure constructed as defined in claim 1 wherein said first section of said shell is constructed of structural steel and said second section of said shell is constructed of a metal alloy resistant to decarburization and embrittlement by hydrogen.

5. A pressure vessel as defined in claim 4 wherein said lining of metal is fabricated from stainless steel.

6. A reactor as defined in claim 4 wherein said second section of said shell is constructed of a metal alloy containing at least 0.005 percent of one or more carbide stabilizing metals of the class consisting of boron, chromium vanadium molybdenum, tungsten, titanium, and columbium.

7. A reactor as defined in claim 6 wherein said second section of said shell is constructed of a metal alloy containing at least 0.4 percent of chromium, and at least 0.4 percent of molybdenum.

References Cited by the Examiner
UNITED STATES PATENTS

| | | | |
|---|---|---|---|
| 2,209,290 | 7/1940 | Watts | 220—63 |
| 2,243,240 | 5/1941 | Zerbe | 220—3 |
| 2,683,654 | 7/1954 | Bergman | 23—288 |
| 2,962,182 | 11/1960 | Rossheim | 220—3 |
| 3,140,006 | 7/1964 | Nelson | 220—63 |

THERON E. CONDON, *Primary Examiner.*

RAPHAEL H. SCHWARTZ, *Assistant Examiner.*